United States Patent
Peirce et al.

(10) Patent No.: US 9,374,709 B2
(45) Date of Patent: Jun. 21, 2016

(54) METHODS AND SYSTEMS FOR BASE STATION DETECTION

(71) Applicants: General Motors LLC, Detroit, MI (US); GM Global Technology Operations LLC, Detroit, MI (US)

(72) Inventors: Kenneth L. Peirce, Grosse Pointe Farms, MI (US); Kobi Jacob Scheim, Pardess Hanna (IL)

(73) Assignee: General Motors LLC, Detroit, MI (US)

( * ) Notice: Subject to any disclaimer, the term of this patent is extended or adjusted under 35 U.S.C. 154(b) by 544 days.

(21) Appl. No.: 13/753,100

(22) Filed: Jan. 29, 2013

(65) Prior Publication Data

US 2014/0213216 A1    Jul. 31, 2014

(51) Int. Cl.
| | |
|---|---|
| H04M 1/66 | (2006.01) |
| H04W 12/08 | (2009.01) |
| H04W 12/12 | (2009.01) |
| H04W 88/08 | (2009.01) |
| H04L 29/08 | (2006.01) |

(52) U.S. Cl.
CPC .............. *H04W 12/08* (2013.01); *H04W 12/12* (2013.01); *H04L 67/12* (2013.01); *H04W 88/08* (2013.01)

(58) Field of Classification Search
USPC ................................................. 455/410, 411
See application file for complete search history.

(56) References Cited

U.S. PATENT DOCUMENTS

| | | | |
|---|---|---|---|
| 5,701,585 A | 12/1997 | Kallin et al. | |
| 6,097,966 A | 8/2000 | Hanley | |
| 6,169,896 B1 | 1/2001 | Sant et al. | |
| 6,862,447 B1 | 3/2005 | Solondz | |
| 6,952,181 B2 | 10/2005 | Karr et al. | |
| 7,305,236 B2 | 12/2007 | Schwinke et al. | |
| 7,373,152 B2 * | 5/2008 | Oesterling | 455/456.1 |
| 2007/0079376 A1 * | 4/2007 | Robert et al. | 726/23 |
| 2009/0181664 A1 | 7/2009 | Kuruvilla et al. | |
| 2011/0151796 A1 * | 6/2011 | Walby et al. | 455/67.7 |
| 2011/0260884 A1 | 10/2011 | Yi et al. | |
| 2012/0230488 A1 | 9/2012 | De Los Reyes | |

* cited by examiner

*Primary Examiner* — Vladimir Magloire
*Assistant Examiner* — Sayed T Zewari
(74) *Attorney, Agent, or Firm* — Dierker & Kavanaugh, P.C.

(57) ABSTRACT

Methods and systems for unauthorized base station detection are disclosed herein. In an example of the method, an in-vehicle controller of a vehicle or an application of a mobile communications device scans a cellular radio environment to identify an available base station. By a signal detection unit in operative communication with the in-vehicle controller or the application, a strength of a signal of the available base station is detected. The in-vehicle controller or the application recognizes that the signal strength is out of the expected signal strength range, and determines that the available base station is the unauthorized base station. While in connection with the unauthorized base station, the in-vehicle controller or the application determines a location of the unauthorized base station. Other examples of the method are also disclosed herein.

15 Claims, 3 Drawing Sheets

METHODS AND SYSTEMS FOR BASE STATION DETECTION

TECHNICAL FIELD

The present disclosure relates generally to methods and systems for base station detection.

BACKGROUND

Vehicles may be equipped with telematics units or other in-vehicle controllers that enable hands free calling, vehicle tracking, navigation instruction transmission, and other like features. Telematics units or other in-vehicle controllers may connect to a cellular network in order to enable these services/features. Mobile communications devices may also connect to the cellular network in order to enable similar services, such as calling, device tracking, etc.

SUMMARY

Methods and systems for unauthorized base station detection are disclosed herein.

In an example of the method, an in-vehicle controller of a vehicle or an application of a mobile communications device scans a cellular radio environment to identify an available base station. By a signal detection unit in operative communication with the in-vehicle controller or the application, a strength of a signal of the available base station is detected. The in-vehicle controller or the application compares the detected signal strength with an expected signal strength range, and categorizes the available base station as an unauthorized base station if the detected signal strength is not within the expected signal strength range. While in connection with the base station that has been categorized as unauthorized, the in-vehicle controller or the application determines a location of the base station that has been categorized as unauthorized.

In another example of the method, an in-vehicle controller of a vehicle or an application of a mobile communications device scans a cellular radio environment to identify an available base station and connects to the available base station. Base station identification information is received at the in-vehicle controller or at the application from the available base station. The base station identification information is transmitted to a call center in selective and operative communication with the vehicle or the mobile communications device. A computing system of the call center running computer-readable instructions embodied on a non-transitory, tangible computer readable medium, determines whether the available base station is the unauthorized base station by comparing the base station identification information with legitimate base station identification information stored in a database at the call center.

In still another example of the method, an in-vehicle controller of a vehicle or an application of a mobile communications device receives a message from an available base station. The message includes signal strength information of the in-vehicle controller or the mobile communications device. A processor of the in-vehicle controller, a processor of the mobile communications device, or a computing system of a call center in operative communication with the in-vehicle controller or the mobile communications device running computer-readable instructions embodied on a non-transitory, tangible computer readable medium, performs an audit of the signal strength information to determine whether the available base station is the unauthorized base station.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Cellular networks have evolved over the years so that functional cellular base stations are relatively cheap, so that many public and private sector services are dependent upon the network(s), so that network equipment is more accessible, etc. The changes in cellular networks have created opportunities for individuals and/or organizations not affiliated with a cellular carrier to utilize and/or effect changes in the network(s). When unauthorized entities use or change the network(s), the use or change may negatively impact the delivery of legitimate services over the network(s). Unauthorized use or change may be achieved using an unauthorized base station. In some instances, the unauthorized base station operates at a lower radio output power (i.e., signal strength) than that of an authorized base station, and as such, it may be difficult for an authorized base station to detect the unauthorized base station because its own signal may mask the signal of the unauthorized base station. In other instances, the unauthorized base station transmits falsely high signal strength information of a mobile device (e.g., an in-vehicle controller or a mobile communications device) to encourage the device to register with the unauthorized base station. Example(s) of the method disclosed herein detect the unauthorized base station using a vehicle or a mobile communications device as the detection mechanism or as part of the detection mechanism.

In the examples disclosed herein, the communication protocol is asymmetric, and thus the infrastructure side (e.g., the base stations) is not able to detect unauthorized base stations while the subscriber side (e.g., in-vehicle controllers, mobile communications devices, etc.) is able to detect unauthorized base stations.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, the term "communication" is to be construed to include all forms of communication, including direct and indirect communication. As such, indirect communication may include communication between two components with additional component(s) located therebetween.

Figure 1:
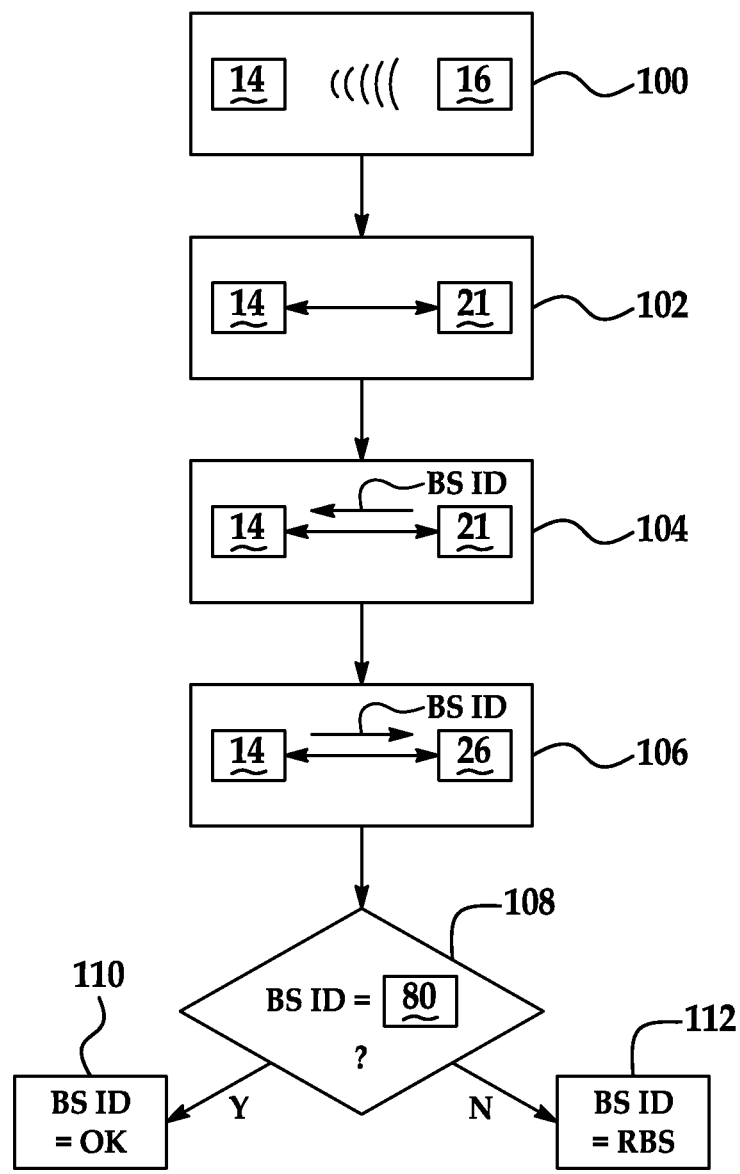
FIG. 1 is a schematic flow diagram illustrating an example of the method for detecting an unauthorized base station.
Figure 2:
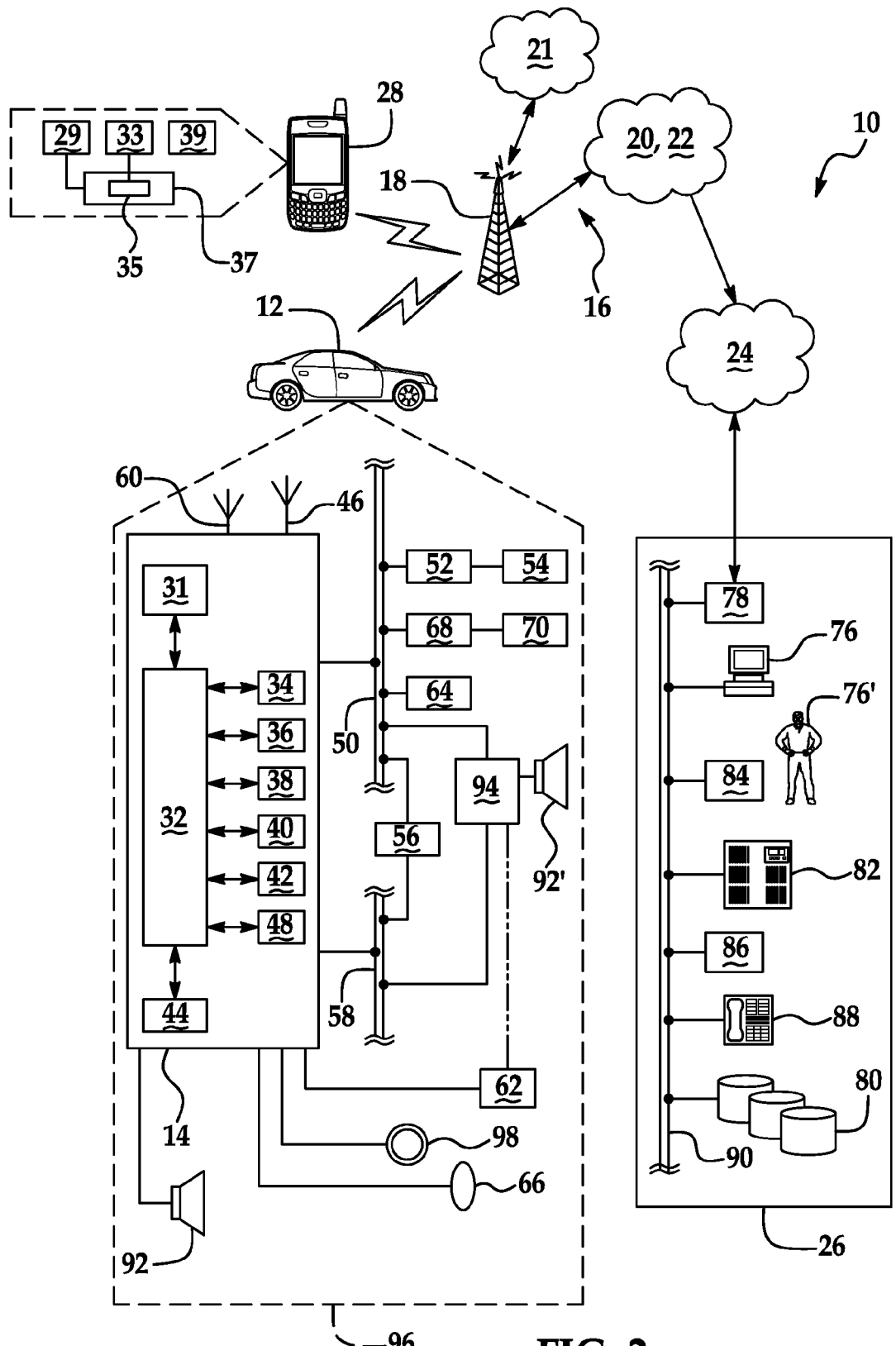
FIG. 2 is a schematic diagram depicting an example of a system for detecting an unauthorized base station.
Figure 3:
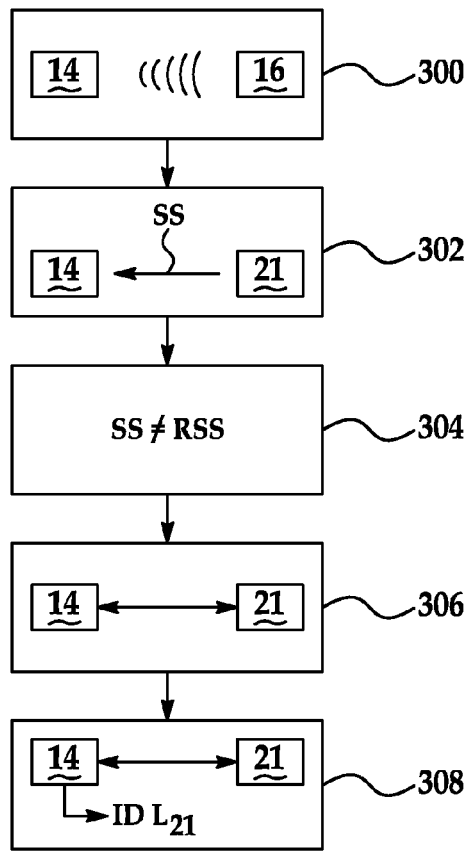
FIG. 3 is a schematic flow diagram illustrating another example of the method for detecting an unauthorized base station.
Figure 4:
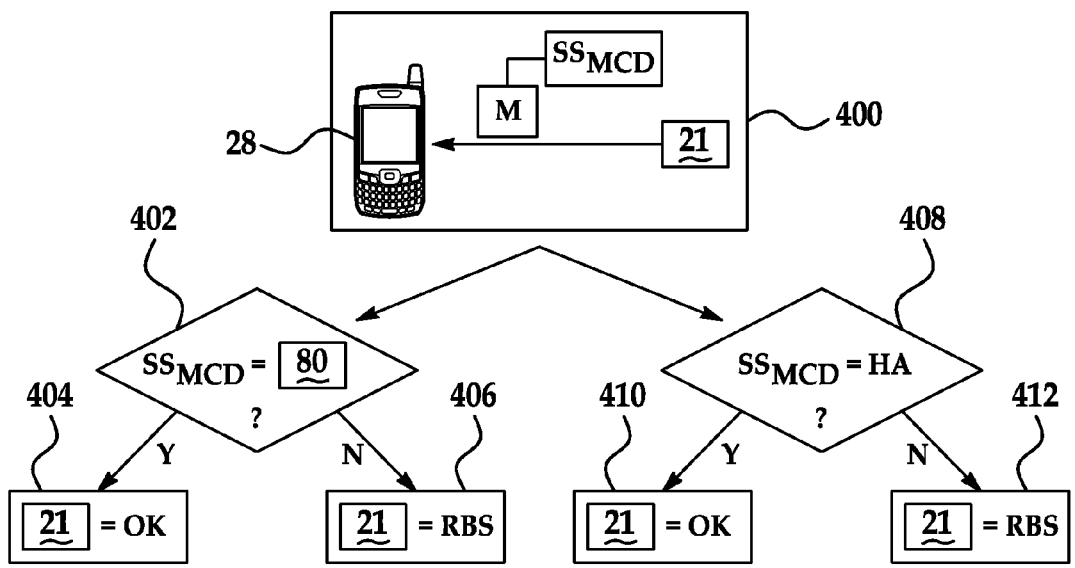
FIG. 4 is a schematic flow diagram illustrating another example of the method for detecting an unauthorized base station.

FIG. 1 depicts an example of the unauthorized base station detection method, and FIG. 2 depicts an example of a system 10 that may be used to carry out the method. FIGS. 1 and 2 will be discussed together. FIGS. 3 and 4 depict other examples of the unauthorized base station detection method, and the system 10 of FIG. 2 may also be used to carry out these examples of the method. The method of FIGS. 3 and 4 will be discussed further hereinbelow.

It is to be understood that the overall architecture, setup and operation, as well as many of the individual components of the system 10 shown in FIG. 2 are generally known in the art. It is to be understood, however, that additional components and/or other systems not shown here could employ the method(s) disclosed herein.

As shown in FIG. 2, the system 10 includes a mobile vehicle 12, an in-vehicle controller 14 operatively disposed in the mobile vehicle 12, a carrier/communication system 16 (including, but not limited to, one or more cell towers 18, one or more base stations 20 and/or mobile switching centers (MSCs) 22, and one or more service providers (not shown) including mobile network operator(s)), one or more land networks 24, and one or more call centers 26. The carrier/communication system 16 is part of a cellular radio environment, which may include a variety of wireless network providers utilizing the same or a variety of radio access technologies.

It is to be understood that the system 10 shown in FIG. 2 may also include, in addition to or instead of the mobile vehicle 12, a mobile communications device 28. While the discussion of the methods shown in FIGS. 1 and 3 involves the mobile vehicle 12 and the in-vehicle controller 14, it is to be understood that these examples of the method may also be performed using the mobile communications device 28.

The mobile communications device 28 may be a smart phone, such as a GSM/LTE phone or a GSM/CDMA/LTE phone. The mobile communications device 28 includes physical hardware, such as processor 29 (e.g., microprocessor, microcontroller, etc.), memory 33, and wireless communications module 39. The processor 29 is configured to run software 37, including application 35. The application 35 includes computer readable code/instructions embedded on a non-transitory, tangible computer readable medium for scanning, comparing, recognizing, determining, and/or performing other steps of the methods (e.g., those steps described herein as being performed by a component of the in-vehicle controller 14). The memory device(s) 33, for example, may be configured to store the application 35 and other software 37. Furthermore, the wireless communications module 39 may be used to transmit data to the call center 26.

Vehicle 12 is a mobile vehicle, such as a motorcycle, car, truck, recreational vehicle (RV), boat, plane, etc., and is equipped with suitable hardware and computer-readable instructions that enable it to communicate (e.g., transmit and/or receive voice and data communications) over the carrier/communication system 16. In an example, the carrier/communication system 16 is a two-way radio frequency communication system. The wireless carrier/communication system 16 may be used to establish communication between the in-vehicle controller 14 and any outside communications device or system (e.g., a mobile phone, a landline telephone, component(s) at the call center 26).

The in-vehicle controller 14 is an on-board vehicle dedicated communications device (e.g., a telematics unit) that includes hardware components that are capable of running computer-readable instructions, which are embodied on non-transitory, tangible computer-readable media. The computer-readable media may include any one of many physical media such as, for example, electronic, magnetic, optical, electro-magnetic, or semiconductor media. More specific examples of suitable computer-readable media include hard drives, a random access memory (RAM), a read-only memory (ROM), an erasable programmable read-only memory (EPROM), or a portable CD, DVD, or flash drive. Examples of the computer-readable instructions may be for scanning the cellular radio environment, for comparing signal strengths, or for carrying out other steps of the method disclosed herein.

The in-vehicle controller 14 also provides a variety of other services, both individually and through its communication with the call center 26. In an example, the call center 26 is a facility that may be owned and operated by an in-vehicle controller service provider (e.g., a telematics service provider). Several examples of these services include, but are not limited to: turn-by-turn directions and other navigation-related services provided in conjunction with a GPS based chipset/component 40; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an in-vehicle infotainment controller 56 operatively connected to the in-vehicle controller 14 via a vehicle bus 50 and an audio bus 58. The listed services are by no means an exhaustive list of all the capabilities of in-vehicle controller 14, but are simply an illustration of some of the services that the in-vehicle controller 14 is capable of offering.

The in-vehicle controller 14 generally includes an electronic processing device 32 operatively coupled to one or more types of electronic memory 34, a signal detection unit 31, a cellular chipset/component 36, a wireless modem 38, a navigation unit containing a location detection (e.g., global positioning system (GPS)) chipset/component 40, a real-time clock (RTC) 42, a short-range wireless communication unit 44 (e.g., a BLUETOOTH® unit), a short range wireless antenna 60, and/or a dual mode antenna 46. Generally, dual mode antenna 46 services the signal detection unit 31, the location detection chipset/component 40, and the cellular chipset/component 36. It is to be understood that the in-vehicle controller 14 may be implemented without one or more of the above listed components (e.g., the real-time clock 42). It is to be further understood that in-vehicle controller 14 may also include additional components and functionality as desired for a particular end use.

The electronic processing device 32 (also referred to herein as the processor 32) may be a micro controller, a controller, a microprocessor, a host processor, and/or a vehicle communications processor. In another example, electronic processing device 32 may be an application specific integrated circuit (ASIC). Alternatively, electronic processing device 32 may be a processor working in conjunction with a central processing unit (CPU) performing the function of a general-purpose processor. In an example, the electronic processing device 32 is capable of running software programs having computer-readable code/instructions to initiate and/or perform one or more steps of the method disclosed herein.

The location detection chipset/component 40 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component 40 may also include, for example, Glonass (i.e., global navigation satellite system), Sbas (i.e., satellite-based augmentation systems), or a D-GPS (differential global positioning system).

The cellular chipset/component 36 may be an analog, digital, dual-mode, dual-band, multi-mode and/or multi-band cellular phone. The cellular chipset-component 36 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi. In these instances, the cellular chipset/component 36 may operate in conjunction with the short-range wireless communication unit 44.

Also associated with electronic processing device 32 is the previously mentioned real-time clock (RTC) 42, which provides accurate date and time information to the in-vehicle controller 14 hardware and software components that may require and/or request date and time information. In an example, the RTC 42 may provide date and time information periodically, such as, for example, every ten milliseconds.

The electronic memory 34 of the in-vehicle controller 14 may be configured to store computer-readable instructions to be executed by the processor 32, including instructions for scanning the cellular radio environment 16, instructions for determining whether a detected signal strength is out of an expected signal strength range, or other instructions for carrying out the various examples of the method disclosed herein.

The in-vehicle controller 14, using the signal detection unit 31, monitors a scan of all cellular networks that are available in the cellular radio environment (including carrier/communication system 16). This is shown at reference numeral 100 in the example of the method shown in FIG. 1. The signal detection unit 31 is configured to monitor whenever a scan or communication network acquisition is being performed and/or any background tasks performed by the network access device (not shown) in the in-vehicle controller 14. In some instances, the in-vehicle controller 14 scans the available cellular networks whenever in awake mode (i.e., performs a continuous scan), and in other instances, the in-vehicle controller 14 scans the available cellular networks at predetermined intervals that are set within the signal detection unit 31. These intervals may be set by the manufacturer, and thus are integral with the signal detection unit 31. In still other instances, the scan may be initiated by recognition of some trigger. For example, a scan may be initiated when a new base station is recognized as the vehicle 12 or mobile communications device 28 is travelling.

During the scan, the in-vehicle controller 14, via processor 32 and signal detection unit 31, monitors all of the available networks for any detectable signals, such as power signals of the base station (including low power signals), power signals of the mobile communications device 28, base station identification signals, etc. Scanning all of the available cellular networks is desirable so that unauthorized base station(s) 21 may be detected. A low power signal is any signal whose strength is less than an expected received signal level (e.g., in dBm) or less than an expected signal to interference plus noise ratio (e.g., in dB). The expected signal level and/or expected signal to interference plus noise ratio may be stored in the memory 34. Upon detecting available signals, the signal detection unit 31 in conjunction with the processor 32 (running computer-readable instructions) may compare the strength or ratio associated with the detected signals with the stored expected values. In addition to or alternatively to signal content or structure (that can be used to generate base station identification information), the base station identity itself is broadcasted (as described in reference to FIG. 1) and recognized during the scan. Still further, as will be described in reference to FIG. 4, the signal of the mobile communications device 28 detected (or allegedly detected) by the base station 20, 21 may be broadcasted and recognized during the scan.

It is to be understood that the gain level of the signal detection unit 31 may automatically be increased during scanning. In an example, the signal detection unit 31 may include one or more controlled amplifiers (not shown) which can dynamically alter the receiver's gain in order to detect signals with lower power levels. In another example, the call center 26 may remotely control the gain through signals sent to the in-vehicle controller 14. This may be desirable when the call center computing system 84 (e.g., a computer or server connected to a network or other computing equipment) recognizes that the vehicle 12 is travelling in an area where suspicious base stations have been previously reported or detected.

As shown in the method of FIG. 1 at reference numeral 102, when a signal is detected that may be affiliated with an unauthorized base station 21, the in-vehicle controller 14 connects to the base station 21 via the cellular chipset-component 36 and/or the wireless modem 38, and the carrier system 16.

Vehicle communications (e.g., between the vehicle 12 and the base station 21, or between the vehicle 12 and the call center 26) generally utilize radio transmissions to establish a voice channel with carrier system 16 such that both voice and data transmissions may be sent and received over the voice channel. In some instances, vehicle communications are enabled via the cellular chipset/component 36 for voice communications and the wireless modem 38 for data transmission. In order to enable successful data transmission over the voice channel, wireless modem 38 applies some type of encoding or modulation to convert the digital data so that it can communicate through a vocoder or speech codec incorporated in the cellular chipset/component 36. It is to be understood that any suitable encoding or modulation technique that provides an acceptable data rate and bit error may be used with the examples disclosed herein.

The communications between the vehicle 12 and the base station 21 may also be achieved using the short-range wireless communication unit 44 and short-range wireless communication technologies, such as BLUETOOTH®, dedicated short-range communications (DSRC), or Wi-Fi. Use of these interfaces will depend, at least in part, on the distance of the vehicle 12 from the base station 21. Wi-Fi may be more desirable when the distances are slightly longer than those distances for which BLUETOOTH® and dedicated short-range communications (DSRC) are used.

It is to be understood that a portion of the carrier/communication system 16 may be a cellular telephone system or any other suitable wireless system that transmits signals between the vehicle hardware 96 and land network 24. According to an example, the wireless portion of the carrier/communication system 16 includes one or more cell towers 18, base stations 20 and/or mobile switching centers (MSCs) 22, as well as any other networking components required to connect the wireless portion of the system 16 with land network 24. The wireless portion of the carrier/communication system 16 further includes other supporting systems, including SMSCs or short message service controllers, which are systems specifically designed to send, deliver, and/or transmit SMS or text messages to a desired destination.

A communications service provider (e.g., a wireless carrier) generally owns and/or operates the carrier/communication system 16, while an unauthorized user may set up the unauthorized base station 21. The communications network provider includes a mobile network operator that monitors and maintains the operation of the communications network. The network operator directs and routes calls, and troubleshoots hardware (cables, routers, network switches, hubs, network adaptors), software, and transmission problems. It is to be understood that, although the communications network provider may have back-end equipment, employees, etc. located at the call center 26, the call center 26 is a separate and distinct entity from the network provider. In an example, the equipment, employees, etc. of the communications network provider are located remote from the call center 26. The communications network provider provides telephone and/or Internet services, while the telematics service provider provides a variety of telematics-related services (such as, for example, those discussed hereinabove). It is to be understood that the communications network provider may interact with the call center 26 to provide services (such as emergency services) to the vehicle user(s).

It is to be understood that various cell tower/base station/MSC arrangements are possible and could be used with the wireless portion of the system 16. For example, a base station 20 and a cell tower 18 may be co-located at the same site or they could be remotely located, or a single base station 20 may be coupled to various cell towers 18, or various base stations 20 could be coupled with a single MSC 22. A speech codec or vocoder may also be incorporated in one or more of the base stations 20, but depending on the particular architecture of the wireless network 16, it could be incorporated within an MSC 22 or some other network components as well.

Land network 22 may be a conventional land-based telecommunications network that is connected to one or more landline telephones and connects the wireless portion of the carrier/communication network 16 to the service center 26. For example, land network 22 may include a public switched telephone network (PSTN) and/or an Internet protocol (IP) network. It is to be understood that one or more segments of the land network 24 may be implemented in the form of a standard wired network, a fiber or other optical network, a cable network, other wireless networks such as wireless local networks (WLANs) or networks providing broadband wireless access (BWA), or any combination thereof.

While connected to the base station 21 (as shown at reference numeral 102 in FIG. 1), the in-vehicle controller 14 may request base station identification information from the base station 21. In the request, the in-vehicle controller 14 may query the base station 21 for the cellular ID of the base station 21, the equipment ID of the base station 21, or any other information that will identify the base station 21. The other information may include any identifiable set of parameters associated with the base station 21, such as an equipment category.

The in-vehicle controller 14 may transmit the query to the base station 21 for the base station identification information through the vehicle bus 50. The vehicle bus 50 may utilize a variety of networking protocols, such as a controller area network (CAN), a media oriented system transfer (MOST), a local interconnection network (LIN), an Ethernet or TCP/IP, and other appropriate connections such as those that conform with known ISO, SAE, and IEEE standards and specifications, to name a few. The vehicle bus 50 enables the vehicle 12 to send signals (i.e., real-time bus messages) from the in-vehicle controller 14 to various units of equipment and systems both outside the vehicle 12 and within the vehicle 12 to perform various functions, such as requesting information, unlocking a door, executing personal comfort settings, and/or the like. The vehicle bus 50 also enables the vehicle 12 to receive signals at the in-vehicle controller 14 from various units of equipment and systems both outside the vehicle 12 and within the vehicle 12.

In response to the query, the base station 21 transmits one or more pieces of identification information (e.g., the cellular ID, equipment ID, etc., shown as BS ID in FIG. 1) to the in-vehicle controller 14. This information may be received at the vehicle bus 50, and then transmitted to one or more components of the in-vehicle controller 14.

As shown at reference numeral 106 in FIG. 1, the in-vehicle controller 14 then sends the base station identification information to the call center 26. The in-vehicle controller 14 includes, in some instances, a vehicle data upload (VDU) system 48, which is configured to receive the base station identification data (BS ID) from the vehicle bus 50, packetize the data, and upload the packetized raw data to the call center 26. In one example, the VDU system 48 is operatively connected to the processor 32 of the in-vehicle controller 14, and thus is in communication with the call center 26 via the bus 50 and the carrier/communication system 16. In another example, the VDU 48 may be the in-vehicle controller's central data system that can include a modem, a processor, and an on-board database. The database can be implemented using a separate network attached storage (NAS) device or can be located elsewhere, such as in memory 34, as desired. The VDU system 48 has an application program that handles the vehicle data upload processing, including communication with any external entity and the setting and processing of triggers which initiate a data upload event (i.e., a VDU event).

The call center 26 receives the packetized data from the vehicle 12 and is configured to run a comparison between the received base station identification data and legitimate base station data stored in its database(s) 80. In general, the call center 26 is designed to provide the vehicle 12 and its hardware 96 with a number of different system back-end functions. According to the example shown in FIG. 2, one call center 26 generally includes one or more switches 78, servers 82, databases 80, live and/or automated advisors 76, 76', a computing system 84 which includes processing equipment (e.g., a computer or server connected to a network), a communications module 86, as well as a variety of other telecommunication and computer equipment 88 that is known to those skilled in the art. These various call center 26 components are coupled to one another via a bus 90, such as one similar to the vehicle bus 50 previously described.

It is to be appreciated that the call center 26 may be any central or remote facility, manned or unmanned, mobile or fixed, localized or delocalized, to or from which it is desirable to exchange voice and data communications. As such, the live advisor 78' may be physically present at the call center 26 or may be located remote from the call center 26 while communicating therethrough.

Switch 78, which may be a private branch exchange (PBX) switch, routes incoming signals so that voice transmissions are usually sent to either the live advisor 78' or the automated response system 78, and data transmissions are passed on to a modem or other piece of equipment (not shown) for demodulation and further signal processing. The modem preferably includes an encoder, as previously explained, and can be connected to various devices such as the server 82 and database 80.

The computing system 84, which is often used in conjunction with the computer equipment 88, is generally equipped with suitable software and/or programs enabling the computing system 84 to accomplish a variety of call center 26 functions. The various operations of the call center 26 are carried out by one or more computers (e.g., computing system 84 and/or computer equipment 88). The computer system and equipment 84, 88 (including computers) may include a network of servers (including server 82) coupled to both locally stored and remote databases (e.g., database 80) of any information processed. In an example, the computing system 84 executes computer-readable instructions (i.e., software) for receiving and processing the base station identification information (BS ID) received from the in-vehicle controller 14 during a VDU event. In particular, the computing system 84 compares the received base station identification information (BS ID) with identification information that had previously been stored for legitimate base stations (i.e., authorized base station(s) 20 that is/are part of the carrier system 16 or system of another wireless network carrier).

The legitimate base station identification information may have been received at the call center 26 directly from the wireless network carrier. The call center 26 may generate and maintain a database (e.g. database 80) including legitimate base station identification information that may be gathered over time. The wireless network carrier may send updated information at predetermined time periods (e.g., quarterly) and/or whenever changes have been made to the network (e.g., addition of base station(s), removal of base station(s), changes to base station equipment, etc.). The legitimate base station identification information may have been input into the database 80 by the live and/or automated advisors 76, 76'.

As shown at reference numeral 108 in FIG. 1, the computing system 84 (running computer-readable instructions) may utilize the received base station identification information BS ID to query the database(s) 80 for that information. As an example, the received cellular ID may be used to query the database(s) 80 which includes a list of cellular IDs for legitimate base stations. The query could also be limited using position data. The computer-readable instructions are configured so that the computing system 84 can make a determination as to whether the received base station identification information BS ID matches any legitimate base station identification information stored in the database(s) 80. When the database(s) 80 returns the results of the query and search and the results indicate a match, the computing system 84 determines that the base station 21 associated with the received base station identification information BS ID is a legitimate base station (as shown at reference numeral 110 of FIG. 1). However, when the database(s) 80 returns the results of the query and search and the results indicate that no match has been found, the computing system 84 determines that the base station 21 associated with the received base station identification information BS ID is an unauthorized base station (RBS, as shown at reference numeral 112 of FIG. 1).

The results of the query may be transmitted from the call center 26 back to the in-vehicle controller 14 so that the in-vehicle controller 14 is made aware of the type of base station (i.e., unauthorized or legitimate) to which it is connected. This information may be transmitted as a message by the communications module 86 of the call center 26. The communications module 86 includes suitable communications equipment that enables the call center 26 to establish a communication with an outside entity (e.g., the vehicle 12). This equipment may, for instance, be capable of handling voice calls, packet data sessions, or other messaging-based communications between the call center 26 and outside entities, such as the vehicle 12. The call center communications module 86 may also transmit the information to the legitimate cellular network providers so they are made aware of the unauthorized base stations(s) 21.

The method depicted in FIG. 1 utilizes many of the components of the system 10 shown in FIG. 2. However, FIG. 2 illustrates other components that may be part of the system 10, which may or may not be used in conjunction with the methods described in FIGS. 1 and/or 3.

The vehicle 12 may include hardware 96, which includes one or more buttons, knobs, switches, keyboards, and/or controls 98 for enabling a vehicle occupant to activate or engage one or more of the vehicle hardware components. In one example, one of the buttons 98 may be an electronic pushbutton used to initiate voice communication with the call center 26 (whether it be a live advisor 76 or an automated call response system 76') to request emergency services, for example.

The hardware 96 may also include a microphone 66, which provides an in-vehicle occupant with a means for inputting verbal or other auditory commands. The microphone 66 may be equipped with an embedded voice processing unit utilizing human/machine interface (HMI) technology known in the art. Conversely, speaker(s) 92, 92' provides verbal output to the vehicle occupants and can be either a stand-alone speaker 92 specifically dedicated for use with the in-vehicle controller 14 or can be part of a vehicle audio component 94 (see speaker 92'). Microphone 66 and speaker(s) 92, 92' enable vehicle hardware 96 and the call center 26 to communicate with the occupants through audible speech.

The audio component 94 is operatively connected to the vehicle bus 50 and an audio bus 58. The audio component 94 receives analog information, rendering it as sound, via the audio bus 58. Digital information is received via the vehicle bus 50. The audio component 94 provides AM and FM radio, satellite radio, CD, DVD, multimedia and other like functionality in conjunction with an infotainment controller 56. The audio component 94 may contain a speaker system, or may utilize speaker 92, 92' via arbitration on vehicle bus 50 and/or audio bus 58.

The vehicle 12 may also include a display 62. The display 62 may be operatively directly connected to or in communication with the in-vehicle controller 14, or may be part of the in-vehicle infotainment controller 56. Examples of the display 62 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The in-vehicle controller 14 may also be in connection with one or more other vehicle systems. The vehicle systems may include the crash and or collision sensors 54 and other vehicle sensors 70. The crash sensors 54 provide information to the in-vehicle controller 14 via the crash and/or collision detection sensor interface 52 regarding the severity of a vehicle collision, such as the angle of impact and the amount of force sustained. The vehicle crash and/or collision detection sensor interface 52 is/are operatively connected to the vehicle bus 50. The other vehicle sensors 70, connected to various sensor interface modules 68, are also operatively connected to the vehicle bus 50. Examples of the other vehicle sensors 70 include, but are not limited to, gyroscopes, accelerometers, magnetometers, emission detection and/or control sensors, lane departure sensors (e.g., video sensors, laser sensors, infrared sensors, etc.), speed sensors, following distance sensors (e.g., radar sensors, video sensors, infrared sensors, ultrasonic sensors, etc.), braking activity sensors, environmental detection sensors, and/or the like. Examples of the sensor interface modules 68 include powertrain control, climate control, body control, and/or the like.

Referring now to FIG. 3, another example of the unauthorized base station detection method is depicted. As mentioned above, the system 10 shown in FIG. 2 may be used to perform this example of the method. However, it is to be understood that the previously described components of the system 10 that are mentioned in the description of FIG. 3 will not be described again in detail.

As shown at reference numeral 300 of FIG. 3, this example of the method begins with the in-vehicle controller 14, using the signal detection unit 31, monitoring a scan of all cellular networks that are available in the cellular radio environment (including carrier/communication system 16).

During the scan, the in-vehicle controller 14, via processor 32 and signal detection unit 31, monitors all of the available networks for any detectable signals. The signal detection unit 31 performs signal handling and processing functions, and is capable of identifying the strength (SS) of any detectable signal, including those with low power signals. The detection or identification of the signal strength SS is shown at reference numeral 302 of FIG. 3. The strength may be identified in terms of power level, or in terms of a signal to interference plus noise ratio. In this example of the method, scanning all of the available cellular networks is desirable so that unauthorized base station(s) 21 (which typically transmit low power signals) may be detected through signal strength data.

After available signal(s) and its/their associated strength(s) are detected, the processor 32 (running computer-readable instructions) may determine whether the detected signal strength SS is out of the expected signal strength range (RSS). This determination may be made using a variety of techniques.

In an example, the processor 32 compares the signal strength with a preset threshold value. The preset threshold value is stored in the memory 34 of the in-vehicle controller 14 and is accessible by the processor 32. The preset threshold value may be the expected received signal level (e.g., in dBm) or the expected signal to interference plus noise ratio (e.g., in dB). The threshold signal level and/or ratio stored in the memory 34 may be preset values that are based upon standards in the cellular industry. The thresholds may vary depending upon the location. Still further, updated threshold values may be pushed to the in-vehicle controller 14 from the call center 26 that receives updates periodically from the wireless network provider(s).

The processor 32 (running computer-readable instructions) may compare the signal strength SS with the stored threshold value. The computer-readable instructions are configured so that the processor 32 can make a determination as to whether the signal strength SS is below the threshold value. When the comparison indicates that the signal strength SS is at or above the stored threshold value, the processor 32 determines that the signal strength SS is legitimate and that the base station 21 associated with the signal strength SS is a legitimate base station. However, when the comparison indicates that the signal strength SS is below the stored threshold value, the processor 32 determines that the signal strength SS is out of the expected signal strength range (RSS) and that the base station 21 associated with the out of expected range signal strength (RSS) is an unauthorized base station RBS.

In another example, the scanning process identifies multiple base stations, e.g., base station 20 and base station 21, and their respective signals. In this example, the detected signals are compared to one another. When the signals strengths of the different base stations 20, 21 are identical or within some preset value of one another, the processor 32 determines that the strengths SS of both signals are legitimate and that the base stations 20, 21 associated with the various signal strengths SS are legitimate base stations. However, when the signal strength of one of the base stations 21 is weaker than the signal strength of the other of the base stations 20 by the previously mentioned preset value, the processor 32 determines that the strength SS of the weaker signal is out of the expected signal strength range (RSS) and that the base station 21 associated with the weaker signal strength is an unauthorized base station (RBS). It is to be understood that the preset value may vary depending upon the location of the base stations. For example, the preset value may be larger in rural areas than in urban areas.

In still another example, the processor 32 (running computer-readable instructions) may determine that the signal strength SS is out of the expected signal strength range (RSS) when the signal strength SS fluctuates in and out of the expected signal strength range. The amount of fluctuation that leads to a categorization that the base station 21 is unauthorized may vary depending upon the location of the base station 21. For example, a wider fluctuation range may be tolerated in rural areas.

When the signal strength SS is identified as being legitimate, the in-vehicle controller 14 may connect to the base station 21 with confidence that the base station 21 is a legitimate base station 20 and the method may end. Legitimate information may be mapped and transmitted to the call center 26 as described herein.

When the signal strength SS is identified as being out of the expected signal strength range (RSS) (as shown at reference numeral 304 of FIG. 3), the in-vehicle controller 14 may connect to the base station 21 temporarily in order to determine a location of the unauthorized base station 21. The connection between the in-vehicle controller 14 and the unauthorized base station 21 is shown at reference numeral 306 of FIG. 3, and the identification of the location of the unauthorized base station 21 (i.e., ID $L_{21}$) is shown at reference numeral 308 of FIG. 3. In an example, the location of the unauthorized base station 21 may be determined by triangulating the location of the vehicle 12, a direction of the signal of the unauthorized base station 21, and the out of the expected range signal strength (RSS). The vehicle location may be received from the location detection (e.g., global positioning system (GPS)) chipset/component 40 and the direction of the signal of the unauthorized base station 21 may be received from the base station 21. The processor 32 running computer-readable instructions may perform the triangulation to identify the approximate location of the unauthorized base station 21.

The processor 32 of the in-vehicle controller 14 may also map the location of the unauthorized base station 21 with the location(s) of legitimate base station(s) 20 within a predetermined proximity of the unauthorized base station 21. In an example, the predetermined proximity may be from about 10 meters to about 70 meters. In some instances, the location(s) of the legitimate base station(s) 20 may have been previously stored in the memory 34 and may be retrieved from the memory 34 to perform the mapping. In other instances, legitimate base station(s) 20 may be identified during the scanning and their locations may be identified in the same manner as the unauthorized base station(s) 21. Mapping involves labeling the unauthorized base station(s) 21 and the legitimate base station(s) 20 at their respective locations on a base station map.

The base station map may be periodically or continuously updated. The map may also identify a period of time during which the locations had been identified and/or a direction of travel of the vehicle 12 when the locations has been identified. Still further, the map may include signal strength parameters for each of the labeled base stations 20, 21.

The map may be stored in the memory 34 of the in-vehicle controller 14. The map may also or alternatively be transmitted to the call center computing system 84 (for further analysis and/or storage in the database(s) 80) during a VDU event by the VDU system 48 as previously described in reference to FIG. 1.

The map may be used by the vehicle 12 or the call center 26, alone or in conjunction with other generated maps, to identify previously mapped potentially unauthorized base station(s) 21 and to avoid associating with them, to identify changes in the cellular infrastructure, to identify patterns of when certain unauthorized base station(s) 21 are set up and/or taken down, etc.

The call center 26 may also use the mapped information to warn other vehicles 12 within the area of the unauthorized base station 21 of its existence and to avoid associating with it. In particular, the computing system 84 of the call center 26 may receive the base station map from the vehicle 12 and may generate a geographic boundary around the unauthorized base station 21. The call center computing system 84 may obtain information (e.g., location information) that indicates which other subscriber vehicles are then-currently located within the geographic boundary.

The computing system 84 may generate a message that identifies, for example, the unauthorized base station 21, its area of operation, and its signal strength. The message may also include a warning to the in-vehicle controller 14 not to associate with the unauthorized base station 21. This message may be pushed, by the communications module 86, to the other vehicles that were identified as being within the geographic boundary.

The call center 26 may also transmit the mapped information to the legitimate cellular network providers so they are made aware of the unauthorized base stations(s) 21.

In another example of the method (not shown), the location of the unauthorized base station 21 and the mapping may occur at the call center 26. In this example, the VDU unit 48 uploads the location of the vehicle 12, a direction of the signal of the unauthorized base station 21, and the out of expected range signal strength (RSS) to the call center 26. Triangulation may be accomplished by the computing system 84 of the call center 26. In this example, the computing system 84 may also integrate location, signal direction, and signal strength information received from a plurality of vehicles (including vehicle 12) in the same area at the same time.

In the example of the method shown in FIG. 3, while the vehicle 12 is connected to the unauthorized base station 21, the in-vehicle controller 14 may also request base station identification information from the base station 21. In the request, the in-vehicle controller 14 may query the base station 21 for the cellular ID of the base station 21, the equipment ID of the base station 21, or any other information that will identify the base station 21. The other information may include any identifiable set of parameters associated with the base station 21, such as an equipment category. This information may be used in the mapping in order to provide more complete forensic identification of the unauthorized base station 21.

Also while in connection with the unauthorized base station 21, the in-vehicle controller 14 (by the processor 32 running computer-readable instructions) may intentionally transmit invalid signal strength information to the unauthorized base station 21. This invalid information may intentionally and falsely inform the unauthorized base station 21 that its emitted signal is higher than the power level of the signal actually transmitted by the unauthorized base station 21. The invalid information may be transmitted in an effort to entice the unauthorized base station 21 to reduce its output power based on the false belief that it is transmitting at a much higher power level. By reducing the power level of the signals, the unauthorized base station 21 may reduce its signals to insignificant levels that limit the base station's interference in the cellular radio environment.

Referring now to FIG. 4, still another method is depicted. This example of the method is described utilizing an application 35 of the mobile communications device 28. It is to be understood however, that the in-vehicle controller 14 may also be used in this example of the method. As illustrated at reference numeral 400, the mobile communications device 28 receives a message M that includes the signal strength information $SS_{MCD}$ that is emitted (or allegedly emitted) by the mobile communications device 28 and detected (or allegedly detected) by the base station 21. When a mobile communications device 28 is in operation, it listens for messages M from base stations 20, 21 during a scan. The messages M are broadcast regularly by the base station 21, and the messages M tell each of the mobile communications devices 28 that are seen by that base station 21, and the signal strength $SS_{MCD}$ that is seen for each mobile communications device 28. In other words, each mobile communications device 28 is able to determine which base stations 20, 21 see it and the strength of its signal as received by each base station 20, 21.

Upon receiving the signal $SS_{MCD}$, the processor 29 (or 32, or computing system 84) running computer-readable instructions embodied on a non-transitory, tangible computer readable medium, then performs an audit of the signal strength information $SS_{MCD}$ to determine whether the available base station is the unauthorized base station 21. The audit may be performed by querying a database (e.g., database 80 at the call center 26) with legitimate base station signal strength information to determine if the signal strength information $SS_{MCD}$ matches any of the legitimate base station signal strength information (reference numeral 402). If the signal strength information $SS_{MCD}$ matches data in the database 80, the base station is categorized as a legitimate base station 21, 20, as shown at reference numeral 404. If the signal strength information $SS_{MCD}$ does not match data in the database 80, the base station 21 is categorized as an unauthorized base station (RBS), as shown at reference numeral 406.

In another example, the audit may be performed via a comparison of data. In this example, upon receiving the signal $SS_{MCD}$, the processor 29 (or 32, or computing system 84) running computer-readable instructions compares the signal $SS_{MCD}$ to a historical average HA for a legitimate base station located within an area of the available base station 21 to determine if the signal strength information is within a preset range of the historical average HA (reference numeral 408). If the signal strength information $SS_{MCD}$ matches the historical average HA, the base station is categorized as a legitimate base station 21, 20, as shown at reference numeral 410. If the signal strength information $SS_{MCD}$ does not match data in the historical average HA, the base station 21 is categorized as an unauthorized base station (RBS), as shown at reference numeral 412.

While several examples have been described in detail, it will be apparent to those skilled in the art that the disclosed examples may be modified. Therefore, the foregoing description is to be considered non-limiting.

The invention claimed is:

1. A method for detecting an unauthorized base station, comprising:
   scanning, by an in-vehicle controller of a vehicle or an application of a mobile communications device, a cellular radio environment to identify an available base station;
   detecting, by a signal detection unit in operative communication with the in-vehicle controller or the application, a strength of a signal of the available base station;
   comparing the detected signal strength with an expected signal strength range;
   determining that the detected signal strength is out of the expected signal strength range;
   categorizing the available base station as an unauthorized base station;
   connecting to the unauthorized base station;
   while in connection with the unauthorized base station, determining, by the in-vehicle controller or the application, a location of the unauthorized base station by triangulating a location of the vehicle or the mobile communications device, a direction of the signal, and the signal strength; and
   transmitting invalid signal strength information to the unauthorized base station to entice the unauthorized base station to further reduce the signal strength out of the expected signal strength range, wherein the invalid signal strength information falsely informs the unauthorized base station that its emitted signal is higher than a power level of the signal actually transmitted by the unauthorized base station.

2. The method as defined in claim 1 wherein:
   the comparing includes comparing, by a processor of the in-vehicle controller or a processor of the mobile communications device running computer-readable instructions embodied on a non-transitory, tangible computer readable medium, the detected signal strength with a preset threshold value; and
   the method further comprises, from the comparing, recognizing that the detected signal strength is below the preset threshold value.

3. The method as defined in claim 1 wherein:
   the scanning identifies a second available base station in proximity of the available base station, the second available base station emitting a second signal; and
   the comparing includes:
      determining, by the signal detection unit, a strength of the second signal; and
      recognizing, by a processor of the in-vehicle controller running computer-readable instructions embodied on a non-transitory, tangible computer readable medium, that the signal strength is less than the second signal strength.

4. The method as defined in claim 1, further comprising recognizing, by a processor of the in-vehicle controller or a processor of the mobile communications device running computer-readable instructions embodied on a non-transitory, tangible computer readable medium, that the detected signal strength fluctuates.

5. The method as defined in claim 1, further comprising:
   identifying, by a processor of the in-vehicle controller or a processor of the mobile communications device running computer-readable instructions embodied on a non-transitory, tangible computer readable medium, a location of a legitimate base station within a predetermined proximity of the location of the unauthorized base station; and
   mapping, by the processor of the in-vehicle controller or the processor of the mobile communications device, the location of the legitimate base station and the location of the unauthorized base station, thereby generating a base station map.

6. The method as defined in claim 5 wherein the base station map further includes any of:
   a period of time during which the locations had been identified; or
   a direction of travel of the vehicle or the mobile communications device when the locations had been identified.

7. The method as defined in claim 5, further comprising:
   transmitting the base station map to a call center in selective and operative communication with the vehicle or the mobile communications device;
   by a computing system of the call center running computer-readable instructions embodied on a non-transitory, tangible computer readable medium, generating a message identifying the unauthorized base station;
   identifying at least one other vehicle or at least one other mobile communications device then-currently within proximity of the location of the unauthorized base station; and
   pushing the message to the at least one other vehicle or the at least one other mobile communications device.

8. The method as defined in claim 7, further comprising transmitting the message to a legitimate cellular network provider.

9. A system for detection of a base station categorized as unauthorized, comprising:
   an in-vehicle controller of a vehicle or an application of a mobile communications device;
   computer-readable instructions for scanning a cellular radio environment to identify an available base station;
   a signal detection unit in operative communication with the in-vehicle controller or the application, the signal detection unit including a receiver to detect a strength of a signal of the available base station;
   computer-readable instructions for recognizing that the signal strength of the available base station is out of an expected signal strength range and to determine that the available base station is the unauthorized base station;
   wireless communication equipment to connect the in-vehicle controller or the mobile communications device to the unauthorized base station;
   computer-readable instructions for determining a location of the unauthorized base station by triangulating a location of the vehicle or the mobile communications device, a direction of the signal, and the signal strength while the in-vehicle controller or the mobile communications device is in connection with the unauthorized base station; and
   computer-readable instructions for transmitting invalid signal strength information to the unauthorized base station to entice the unauthorized base station to further reduce the signal strength out of the expected signal strength range, wherein the invalid signal strength information falsely informs the unauthorized base station that its emitted signal is higher than a power level of the signal actually transmitted by the unauthorized base station;

each of the computer-readable instructions being embodied on a non-transitory, tangible computer readable medium and executable by a processor of the in-vehicle controller or a processor of the mobile communications device.

10. The system as defined in claim 9 wherein the computer-readable instructions for recognizing that the signal strength of the available base station is out of the expected signal strength range includes:

computer-readable instructions for comparing the signal strength of the available base station with a preset threshold value; and computer-readable instructions for recognizing, from the comparison, that the signal strength of the available base station is below the preset threshold value.

11. The system as defined in claim 9, further comprising:

a second available base station in proximity of the available base station; and a second signal emitted by the second available base station;

and wherein:

the signal detection unit is to detect a strength of the second signal; and the computer-readable instructions for recognizing that the signal strength of the available base station is out of the expected signal strength range include computer-readable instructions for recognizing that the signal strength of the available base station is less than the second signal strength.

12. The system as defined in claim 9 wherein the computer-readable instructions for recognizing that the signal strength of the available base station is out of the expected signal strength range include computer-readable instructions for recognizing that the signal strength of the available base station fluctuates.

13. The system as defined in claim 9, further comprising:

computer-readable instructions for identifying a location of a legitimate base station within a predetermined proximity of the location of the unauthorized base station; and computer-readable instructions for mapping the location of the legitimate base station and the location of the unauthorized base station to generate a base station map.

14. The system as defined in claim 13, further comprising:

a call center in selective and operative communication with the vehicle or the mobile communications device, the call center including a computing system to receive the base station map from the in-vehicle controller or the application; and computer-readable instructions being embodied on a non-transitory, tangible computer readable medium and executable by the call center computing system, the computer-readable instructions including:

computer-readable instructions for generating a message identifying the unauthorized base station; and computer-readable instructions for identifying at least one other vehicle or at least one other mobile communications device then-currently within proximity of the location of the unauthorized base station; and the at least one other vehicle or the at least one other mobile communications device to receive the message from the call center.

15. A method for detecting an unauthorized base station, comprising:

scanning, by an in-vehicle controller of a vehicle, a cellular radio environment to identify an available base station;

detecting, by a signal detection unit in operative communication with the in-vehicle controller, a strength of a signal of the available base station;

comparing the detected signal strength with an expected signal strength range; determining that the detected signal strength is out of the expected signal strength range;

categorizing the available base station as an unauthorized base station;

connecting to the unauthorized base station; and while in connection with the unauthorized base station, determining, by the in-vehicle controller, a location of the unauthorized base station using a location of the vehicle, transmitting invalid signal strength information to the unauthorized base station to entice the unauthorized base station to further reduce the signal strength out of the expected signal strength range, wherein the invalid signal strength information falsely informs the unauthorized base station that its emitted signal is higher than a power level of the signal actually transmitted by the unauthorized base station.

* * * * *